United States Patent
Rinne et al.

[11] Patent Number: 6,098,194
[45] Date of Patent: Aug. 1, 2000

[54] DETECTING MEMORY PROBLEMS IN COMPUTERS

[75] Inventors: Jarmo Rinne, Espoo; Kari Pasanen, Äänekoski, both of Finland

[73] Assignee: Nokia Telecommunications Oy, Espoo, Finland

[21] Appl. No.: 09/066,486

[22] PCT Filed: Oct. 29, 1996

[86] PCT No.: PCT/FI96/00572

§ 371 Date: Apr. 23, 1998

§ 102(e) Date: Apr. 23, 1998

[87] PCT Pub. No.: WO97/16786

PCT Pub. Date: May 9, 1997

[30] Foreign Application Priority Data

Oct. 30, 1995 [FI] Finland ................................. 955187

[51] Int. Cl.⁷ .......................... G06F 11/10; G11C 29/00
[52] U.S. Cl. .......................... 714/807; 714/718; 714/42
[58] Field of Search .................................. 714/718, 805, 714/807, 801, 799, 23, 36, 42, 48, 54; 380/43, 9, 49

[56] References Cited

U.S. PATENT DOCUMENTS

| | | | |
|---|---|---|---|
| 4,355,390 | 10/1982 | Hellwig et al. | 714/722 |
| 4,433,388 | 2/1984 | Oosterbaan | 714/52 |
| 4,691,319 | 9/1987 | Bose et al. | 714/807 |
| 4,727,544 | 2/1988 | Brunner et al. | 463/43 |
| 4,740,968 | 4/1988 | Aichelmann, Jr. | 714/807 |
| 4,843,633 | 6/1989 | Menich et al. | 463/28 |
| 4,849,978 | 7/1989 | Dishon et al. | 714/6 |
| 4,947,396 | 8/1990 | Shin et al. | 714/807 |
| 5,007,053 | 4/1991 | Iyer et al. | 714/718 |
| 5,345,583 | 9/1994 | Davis | 714/23 |
| 5,359,659 | 10/1994 | Rosenthal | 380/4 |
| 5,493,649 | 2/1996 | Silvka et al. | 714/48 |
| 5,553,238 | 9/1996 | Nelson | 714/54 |

FOREIGN PATENT DOCUMENTS

| | | |
|---|---|---|
| 0 297 507 | 1/1989 | European Pat. Off. . |
| 0 371 243 | 6/1990 | European Pat. Off. . |

*Primary Examiner*—Albert De Cady
*Assistant Examiner*—Shelly A Chase
*Attorney, Agent, or Firm*—Altera Law Group, LLC

[57] ABSTRACT

In process controlling computers, such as switching exchanges, faults may prove to be very expensive. Particularly hard to solve are software defects. If problems occur, it is important that maintenance can be directed at the correct target as soon as possible. A threat is constituted by vandals and hackers. If the option for maintaining from elsewhere is incorporated in computers, the danger for misuse consequently increases. Prior art techniques for detecting memory problems do not necessarily reveal defects occurring at regular intervals caused by the method of calculation. Memory defects will occur at regular intervals e.g., if an address line of a memory circuit becomes faulty. A second drawback of the prior art is that the checksum has to be calculated anew if the contents of just one storage location change. The method of detecting memory problems according to the invention is "regularly irregular" so that it detects in a reliable manner an uncontrolled change in any storage area (MA). Furthermore, the checksum (CS) calculated according to the method may be updated upon changes of an element in a storage area (MA) so that the updating requires much less calculation than would calculating the checksum over the entire storage area (MA) being monitored. The method is applicable in detecting hardware and software defects and in expediting the restart of a computer.

12 Claims, 2 Drawing Sheets

DETECTING MEMORY PROBLEMS IN COMPUTERS

BACKGROUND OF THE INVENTION

1. Field of the Invention

The present invention relates to checking the integrity of memory contents in computers.

2. Description of Related Art

FIG. 1 shows the parts of a computer that are essential as far as the invention is concerned. At the initial stage, after power switch-on, the contents of the main memory RAM are in an undefined state. The initial loading of a conventional computer takes place so that power switch-on generates an initial signal INIT which makes e.g. a processor CPU jump into a predetermined address. This memory has, in a Read Only Memory ROM, an initial loading program the execution of which comprises loading the basic parts of the operating system (OS) from a predetermined location in a disk drive HD. The OS basic parts thus loaded contain more advanced loading programs, which load parts of the OS not only from the locations predetermined for the HD in the ROM but from elsewhere as well. These more advanced loading programs, in turn, load other software modules etc.

The software modules are not necessarily located at contiguous areas on the disk drive HD. Upon reading from the HD, it is often the case that information located at different areas of the HD must be read in succession. A suggestive guideline value is that it is possible to read approximately 1 MB/s of contiguous areas from a disk drive, but in practice the reading rate is no more than one half of this. To take an example, loading 30 MB of software may take approximately a minute.

In process controlling computers, such as switching exchanges, faults may prove to be very expensive. Particularly hard to solve are software defects. Hardware defects can often be detected by making comparisons to another apparatus, known to be in a proper working order. Software defects cannot usually be detected in this manner as there usually exists no reference software known to be operating properly. In many cases, the further drawback is often encountered that on the basis of the symptoms it is often impossible to quickly deduct whether the fault is in the hardware or in the software. Uncontrolled changes in a specific storage area may result from either one of the reasons. If problems occur, it is important that maintenance can be directed at the correct target as soon as possible.

A threat is constituted by vandals and "hackers". If the option for remote maintenance is incorporated in computers, the danger for misuse consequently increases.

In order to detect memory problems, several different solutions have been developed. Prior art knows a so-called parity bit by means of which it is possible to have an even number of 1-bits in the storage location (or, if desired, an odd number). As is well known, the use of parity does not detect a simultaneous change of state by an even number of bits in a storage location.

Another commonly used tool is a Cyclic Redundancy Check, CRC. The CRC sum is a useful tool in detecting errors in serial mode data, such as in disk drives and data links. Relating to matrix data, the CRC sum is faced with two problems. The first of these is that CRC sums cannot be used to reliably detect defects that occur at such intervals that result from the method of calculating the CRC sum. The second problem is associated with the fact that the CRC sum has to be calculated anew if the contents of just one storage location change.

SUMMARY OF THE INVENTION

Resulting from the above, it is an object of the present invention to develop a method and apparatus by means of which memory problems of computers can be detected and the aforementioned problems solved. On the one hand, the invention is based on a method which, based on experience gathered up to date, is extensive enough to detect all conceivable uncontrolled changes in the memory, and on the other hand, on employing this method in the various operations of the computer.

The method and the system according to the invention first of all have the advantage of reliably detecting memory problems. This in turn leads to the second advantage, which is that the restart of a computer can be expedited by omitting some operations that in prior art systems are carried out "just in case".

BRIEF DESCRIPTION OF THE DRAWINGS

In the following, the invention will be described in greater detail by means of its preferred embodiments, with reference to the accompanying drawings in which.

DETAILED DESCRIPTION OF THE INVENTION

Figure 2:
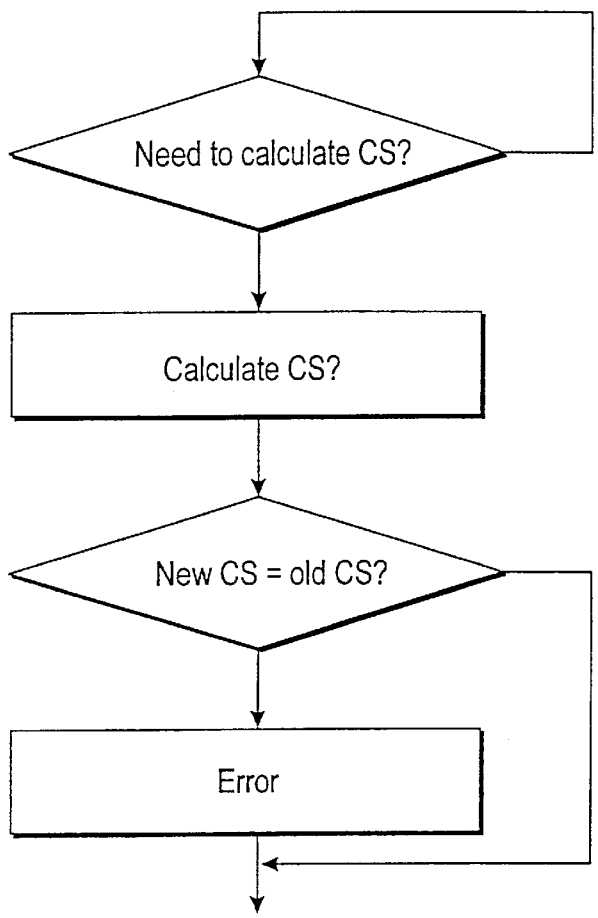
FIG. 2 illustrates using a checksum for monitoring memory contents.

Regarding the flow chart of FIG. 2, the checksum is calculated over a specific storage area, it is compared to the previous checksum calculated, and in case the checksums differ, an error message will be given. In the flow chart of FIG. 2 the significant matter is the manner the calculating the checksum is initiated. According to one embodiment of the invention, the calculation takes place at regular intervals. According to another embodiment, the checksum is calculated in association with specific events, such as switching on a computer, modifying programs, etc.

Figure 3:
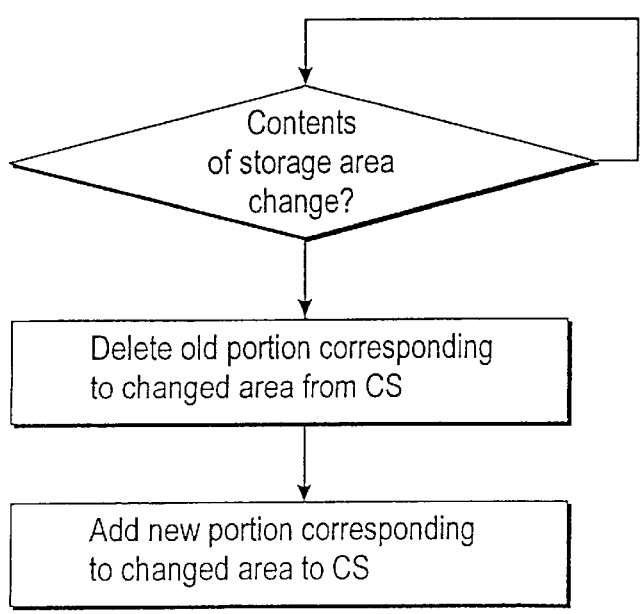
FIG. 3 is a flow chart illustration for maintaining a checksum.

The flow chart of FIG. 3 illustrates how writing into memory takes place. In case the contents of a storage area change, the checksum will be corrected by (i) deleting the portion of the changed storage area from the previous checksum, and (ii) by adding, to the checksum thus changed, a portion corresponding to the new contents of the changed storage area.

Figure 1:
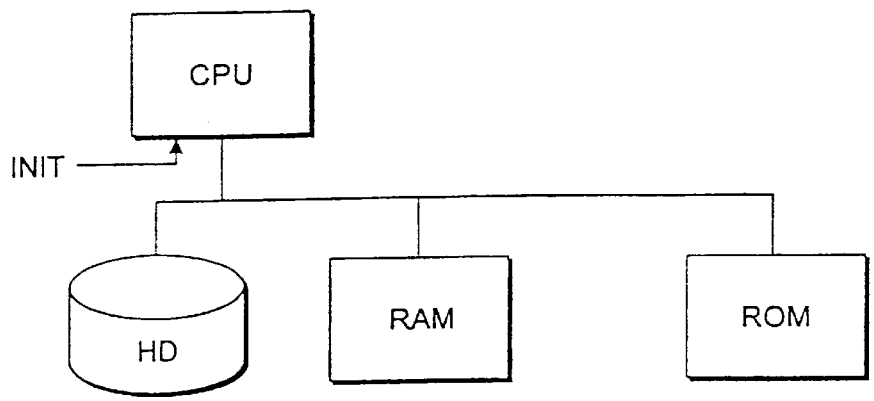
FIG. 1 shows the parts of a computer that are essential as far as the invention is concerned.
Figure 4:
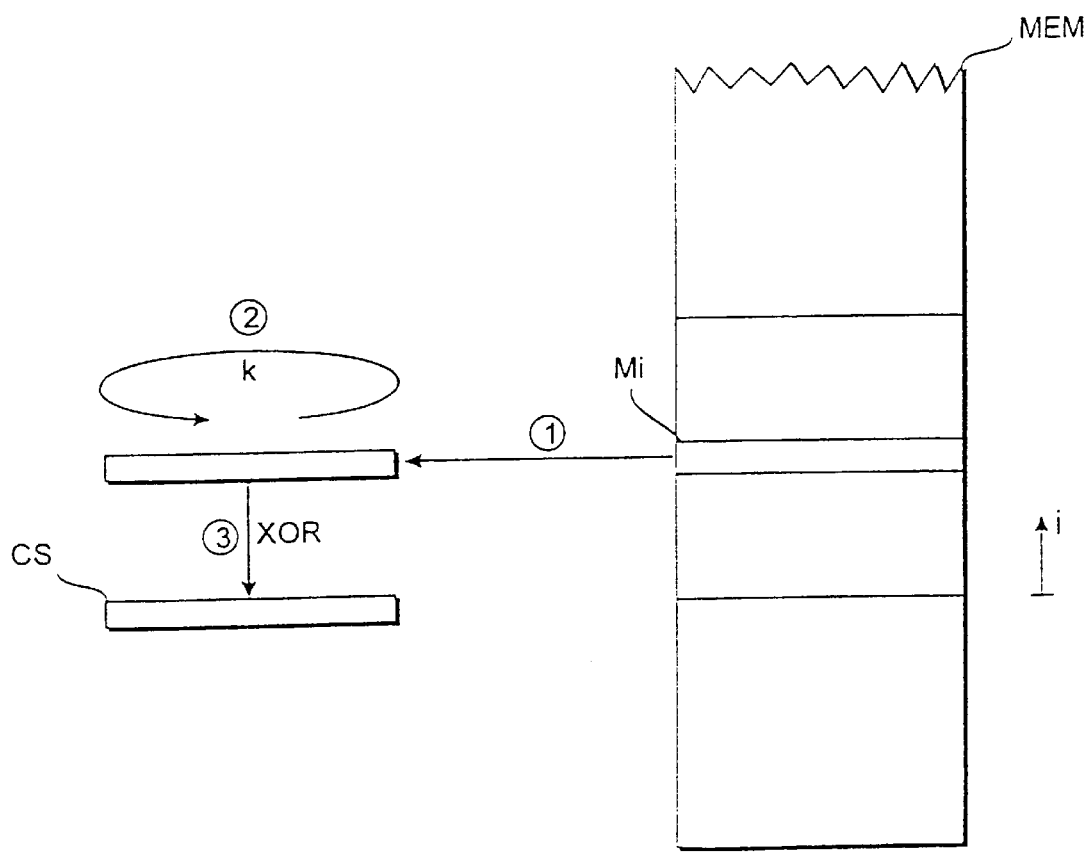
FIG. 4 illustrates calculating a checksum in accordance with the invention.

The simplicity of the flow chart in FIG. 3 ensues from that the prior art methods for calculating a checksum cannot be used for deleting the previous portion of a changed storage area from a calculated checksum and replacing it with a portion corresponding to the new contents of the same storage area. Next, referring to FIG. 4, a new method according to the present invention will be described for calculating a checksum. Out of the total memory MEM of a computer, the checksum is to be calculated over a storage area MA being monitored. The width M of the checksum (CS) is arbitrary, but a suitable value for the width M equals the word length W of the computer. Prior to the calculation, the checksum is given an initial value, e.g. 0. The calculation takes place so that each element $M_i$ (where i denotes an index for the element within the storage area), having M bits, in a storage area MA is summed bitwise to the checksum CS (by an Exclusive OR operation) so that, prior to summing, the element $M_i$ is rotated k bits to the right (in the direction of the least significant bit). The number k of the rotations is obtained from:

$$k = \sum_{j=0}^{\infty} INT(i/M^j)$$

where INT denotes an integer. In practice, the summing does not have to be continued forever but only up to the highest value of j at which Mj is lower than or equal to the element index i (or the highest conceivable index value).

The same result can be achieved by the following fast method. The elements of the storage area MA are summed bitwise (Exclusive OR) to the checksum CS. After each summing, the checksum is rotated one bit to the left (in the direction of the most significant bit). The rotating is repeated if i+1 is divisible by M, and again if i+1 is divisible by $M^2$, etc, until all the conceivable integer powers of M have been gone through. Once all the elements have been summed, the checksum is rotated to the right as many times as it was rotated to the left during the summing.

A noteworthy advantage of this method is that the checksum thus calculated may easily be updated. The updating takes place e.g. as follows:

(1) Summing the data of the changed element to the old data of the element.

(2) Deducting, on the basis of the index of the changed element, how many rotations were made in all at this element when calculating the original checksum.

(3) Rotating the sum to the right to the same extent.

(4) Summing the rotated sum thus obtained to the original checksum. The result thus obtained is a new checksum updated with regard to the changed storage area. If a storage area having an arbitrary size changes, the checksum can be updated by carrying out just two summings per element. Thus, the new checksum does not have to be calculated over the entire storage area, which would be the case with the cyclic redundancy check (CRC).

The number of rotations at the changed element may be calculated by dividing the element index i by conceivable integer powers of M and by summing the integers of the quotients according to equation (1).

Referring to Table 1, an exemplary calculation of a checksum according to the method of the invention will now be described. For reasons of simplicity, it is assumed that the storage area comprises 16 locations that can be addressed by a 4-bit index. In this example, the data of the storage locations also has a width of 4 bits. Also, the initial value of the checksum is set to zero. All these assumptions have been made in order to illustrate the invention, and they do not restrict it in any way.

The contents 1001 of the storage location 0 are summed bitwise to the initial value 0000, and as 0+1 is not divisible by the width (4) of the checksum, the sum is rotated once to the left. The new checksum obtained is 0011. To this sum is added the contents 1011 of the storage location 1, and the sum thus obtained is rotated once to the left because 1+1 is not divisible by the width of the ckecksum. After this, the new checksum is 0001. The process continues is this manner up until the entire storage area has been gone through. At storage locations 3, 7 and 11, the checksum is rotated twice because these indexes incremented by one are divisible by the width of the checksum. At storage location 15, there will be three rotations as 15+1 is divisible by both the width of the checksum and its quadrature. At all other storage locations, the checksum is only rotated once. Lastly, the checksum is rotated 21 times in the opposite direction, i.e. to the right. The final checksum obtained is 0111. The step-by-step progress of the calculation is illustrated in

TABLE 1

| Address | Data | Old CS | Bit sum | New CS | Rotations |
|---------|------|--------|---------|--------|-----------|
| 0000 | 1001 | 0000 | 1001 | 0011 | 1 |
| 0001 | 1011 | 0011 | 1000 | 0001 | 1 |
| 0010 | 1101 | 0001 | 1100 | 1001 | 1 |
| 0011 | 0010 | 1001 | 1011 | 1110 | 2 |
| 0100 | 1011 | 1110 | 0101 | 1010 | 1 |
| 0101 | 1010 | 1010 | 0000 | 0000 | 1 |
| 0110 | 0111 | 0000 | 0111 | 1110 | 1 |
| 0111 | 0010 | 1110 | 1100 | 0011 | 2 |
| 1000 | 0000 | 0011 | 0011 | 0110 | 1 |
| 1001 | 0001 | 0110 | 0111 | 1110 | 1 |
| 1010 | 0111 | 1110 | 1001 | 0011 | 1 |
| 1011 | 0101 | 0011 | 0110 | 1001 | 2 |
| 1100 | 1111 | 1001 | 0110 | 1100 | 1 |
| 1101 | 0011 | 1100 | 1111 | 1111 | 1 |
| 1110 | 1110 | 1111 | 0001 | 0010 | 1 |
| 1111 | 0101 | 0010 | 0111 | 1011 | 3 |
|  |  | 1011 |  | 1101 | −21 |

Next, it is assumed that the contents of e.g. the storage location 0101 change from the value 1010 to 0110. The bitwise sum of the old and new contents will be 1100. On the basis of index 0101 (=5) the bitwise sum 1100 is rotated 5+1=6 times to the right, whereby the result obtained is 0011. When this is summed to the old checksum, the new checksum obtained is 1110. The same result is also obtained by repeating, from the beginning, the procedures discussed in association with Table 1, but with the contents of the storage location 0101 having the new value, in this case 0110.

The checksum can most advantageously be calculated by a computer program. For this purpose, the following program, in the form of pseudocode resembling Pascal, can be utilized.

```
SUM := initial value;
for I := 0 to N-1 do
    SUM := SUM xor X(I);
    SUM := SUM rol 1;
    if (I + I) mod M = 0 then
        SUM := SUM rol 1;
        if (I + 1) mod (M'M) = 0 then
            SUM := SUM rol 1;
            if(I + 1) mod (M*M*M) = 0 then
                SUM := SUM rol 1;
                ...
            end;
        end;
    end;
end;
N1 := N+N/M+N/(M*M)+N/(M*M*M)+N . . . ;
SUM := SUM ror N1;
end;
```

In the above pseudocode, N denotes the size of the storage area being monitored, xor denotes the bitwise sum (Exclusive OR), mod signifies a modulo operator (remainder), rol 1 means a rotate left, and ror 1 correspondingly a rotate right.

The following pseudocode may be used to update the checksum:

```
SUM := initial value;
for I := 0 to N-1 do
    I1 := I+1/M+I/(M*M)+I/(M*M*M)+I . . . ;
    SUM := SUM xor (X(I) ror I1);
end;
```

It is obvious that no checksum is able to detect all memory problems. There is an apparent reason for this: as the information contents of the checksum CS are much smaller than that of the storage location MA over which the ckecksum was calculated, the storage location MA inevitably has several possible contents producing the same checksum CS. In practice, however, the defects are detected reliably. An uncontrolled change of the storage location without a concurrent change in the checksum would require a simultaneous change of several bits in several addresses of the storage area according to a specific mathematical regularity. Although practical memory problems often do manifest mathematical regularity, this regularity is not of such nature that memory problems would remain undetected by the method of the invention. In this respect, it could be said that calculating the checksum in accordance with the invention is "regularly irregular".

The method of the invention for calculating a checksum can be applied e.g. as follows: a dedicated checksum is assigned to each storage area being monitored. Upon changing the contents of the storage area, the checksum is also changed accordingly. The integrity of the checksum is monitored e.g. at specific intervals or in association with specific events. Upon detecting that the checksum does not match, the defect is at least reported and other measures required are additionally taken.

A second way of utilizing the checksum calculation method of the invention is to expedite the restart of a computer. Conventional computers in this case load their entire software from a disk drive, a network etc. By utilizing the checksum according to the invention, it is possible to indicate which storage areas have endured free of defects as regards their contents, resulting in that their contents do not have to be reloaded. In consequence, the start-up of a computer can be expedited by several tens of seconds compared to the prior art technology. Prior to the restart, a checksum CS may be calculated over one or more storage areas MA being monitored, and these checksums may be stored in the main storage. Some systems allow a protection for a part of the memory against later overwriting. In a memory of that type, such checksums may be stored which correspond to different program modules, because once the program module has been loaded into a memory, its contents should not be changed. Alternatively, a predetermined checksum may be associated with each program module stored in the disk drive. During loading the program module, the checksum may first be read out from the disk drive and compared to the checksum calculated over the corresponding storage area. If the checksums are identical, the program module will not have to be loaded anew from the disk drive. The checksums of different modules of software consisting of multiple parts may be stored in a common file the reading of which quickly unravels which modules have undergone the switch-on without defects and which ones should be reloaded from the disk drive.

Although the invention is explained by using computers as examples, the invention is not restricted to computers in a narrow sense but may be applied to all situations where electronic memories are used. Examples of such implementations include computer peripheral devices and communication systems, image and sound memories, data logging systems, control and process automation systems, and various kinds of automatons. It is also obvious to a person skilled in the art that upon advancements in technology the basic idea of the invention can be implemented in various ways. The invention and the embodiments thereof are not restricted to the examples described above but they may vary within the scope of the claims.

What is claimed is:

1. A method for calculating a checksum over a memory area comprising several memory elements, each memory having an index within said memory area;

the method comprising setting the checksum to a predetermined initial value, and for each memory element of the memory area:
    forming a first factor based on the memory element in question,
    forming a second factor based on the checksum value at the previous memory element,
    forming a current value of the checksum based on an exclusive-or operation of the first factor and the second factor,
    rotating the bits of one of said factors or the bits of the current value of the checksum, and
    determining the number of rotations for said rotating step based on the index of the memory element in question.

2. A method as claimed in claim 1, wherein
the second factor is the previous value of the checksum as such,
the first factor is formed by rotating the bits of the memory element k bits to the right in the direction of the least significant bit, wherein $$k = \sum_{j=0}^{\infty} INT(i/M^j)$$

holds true for the number k of the rotations, in which i denotes the index, M denotes the number of bits in each memory element and INT denotes an integer part of an argument.

3. A method as claimed in claim 1, wherein: the first factor is the memory element as such; and
the second factor is formed by rotating the previous value of the checksum by
    determining, at every M's integer power $M^n$ for which $0<M^n<i+1$ holds true, in which i denotes the index and M denotes the number of bits in each memory element, whether said index plus one (i+1) is divisible by M's integer power $M^n$ in question; and
    in response to said index plus one (i+1) being divisible by M's integer power $M^n$ in question, rotating the checksum one bit position to the left; and
    once all the memory elements of the memory area have been gone through, rotating the checksum to the right as many bit positions as it was in all rotated to the left during calculation of the checksum.

4. A method as claimed in claim 1, further comprising the step of updating the checksum from an old value to a new value upon changes in one of the memory elements of said memory area, wherein the updating step comprises:
    summing bitwise the new data of the changed memory element to the old data of the same memory element to form a checksum correction;

deducting, based on the index of the changed memory element, a total number of bit positions rotated at the memory element in question during calculation of the old value of the checksum;

rotating the checksum correction to the right for as many bit positions as it was rotated to the left at this memory element during calculation of the old value of the checksum and summing the rotated checksum correction thus obtained to the old value of the checksum.

5. A method as claimed in claim 1, further comprising the steps of:

Calculating a checksum over at least one memory area;

comparing the checksum calculated over same memory area to a checksum calculated earlier;

in response to a mismatch between the checksums calculated at different times over the same memory area, generating a signal indicating this difference.

6. A method as claimed in claim 5, wherein said calculating and comparing steps are performed periodically at predetermined times.

7. A method as claimed in claim 1, characterized in that, to speed up the restart of a computer comprising a disk drive and a main memory having a faster access time than the disk drive, the method further comprises the steps of:

calculating a first checksum over at least one area of said main memory prior to said restart, restarting the computer, calculating a second checksum over said at least one main memory area after said restart, and comparing the first and second checksums, reloading the contents of said at least one main memory area from the disk drive only in response to a mismatch between the first and second checksums.

8. A method as claimed in claim 7, further comprising the step of storing the first checksum in the computer's main memory.

9. A method as claimed in claim 8, wherein the first checksum is stored in a write-protected main memory.

10. A method as claimed in claim 7, further comprising the step of storing the first checksum on the disk drive.

11. A digital processor comprising a memory area having several memory elements, each element having an index within said memory area, the digital processor further comprising software for calculating a checksum over said memory area, the software being operable to set the checksum to a predetermined initial value, and for each memory element of the memory area, to:

form a first factor based on the memory element in question, form a second factor based on the checksum value at the previous memory element, form a current value of the checksum based on an exclusive-or operation of the first factor and the second factor, rotate the bits of one of said factors or the bits of the current value of the checksum, and determine the number of rotations for said rotating based on the index of the memory element in question.

12. A digital computer comprising a disk drive and a main memory having a faster access time than the disk drive, the computer comprising a first software routine to restart the computer and a second software routine to:

calculate a first checksum over at least one area of said main memory prior to said restart, restart the computer, calculate a second checksum over said at least one main memory area after said restart, and compare the first and second checksums, reload the contents of said at least one main memory area from the disk drive only in response to a mismatch between the first and second checksums.

* * * * *